(12) United States Patent
Galbreath et al.

(10) Patent No.: US 10,124,699 B2
(45) Date of Patent: Nov. 13, 2018

(54) SEAT ASSEMBLY HAVING SHELL WITH FLEXIBLE BOLSTERS

(71) Applicant: LEAR CORPORATION, Southfield, MI (US)

(72) Inventors: Ashford Allen Galbreath, Troy, MI (US); Asad S. Ali, Troy, MI (US); Michael R. Powell, Waterford, MI (US)

(73) Assignee: LEAR CORPORATION, Southfield, MI (US)

( * ) Notice: Subject to any disclaimer, the term of this patent is extended or adjusted under 35 U.S.C. 154(b) by 6 days.

(21) Appl. No.: 15/386,317

(22) Filed: Dec. 21, 2016

(65) Prior Publication Data

US 2018/0170217 A1   Jun. 21, 2018

(51) Int. Cl.
| | |
|---|---|
| *B60N 2/22* | (2006.01) |
| *B60N 2/58* | (2006.01) |
| *B60N 2/68* | (2006.01) |
| *B60N 2/64* | (2006.01) |

(52) U.S. Cl.
CPC .............. *B60N 2/22* (2013.01); *B60N 2/58* (2013.01); *B60N 2/64* (2013.01); *B60N 2/686* (2013.01)

(58) Field of Classification Search
CPC ......... B60N 2/2878; B60N 2/22; B60N 2/99; B60N 2/64; B60N 2/686; B60N 2/58
USPC ............. 297/354.12, 452.1, 452.14, 452.18, 297/452.33, 452.3, 284.9
See application file for complete search history.

(56) References Cited

U.S. PATENT DOCUMENTS

| | | | | |
|---|---|---|---|---|
| 4,455,047 A * | 6/1984 | Watanabe | ................ | B60N 2/62 297/224 |
| 4,500,136 A * | 2/1985 | Murphy | ................ | A47C 7/022 297/284.9 |
| 4,589,695 A * | 5/1986 | Isono | ..................... | A47C 7/022 297/284.11 |
| 4,607,887 A * | 8/1986 | Vail | ........................ | A47C 7/18 297/284.9 |
| 4,636,000 A * | 1/1987 | Nishino | ............... | B60N 2/4492 297/284.9 |
| 5,149,173 A * | 9/1992 | Jay | .......................... | A61G 5/12 297/284.9 |
| 5,370,444 A * | 12/1994 | Stulik | .................... | A47C 1/023 297/284.11 |
| 5,681,083 A * | 10/1997 | Nelson | .................... | A47C 7/00 297/284.1 |

(Continued)

FOREIGN PATENT DOCUMENTS

WO   2015077231 A1   5/2015

*Primary Examiner* — Jose V Chen
(74) *Attorney, Agent, or Firm* — Brooks Kushman P.C.

(57) ABSTRACT

A vehicle seat assembly a seat bottom and a seatback pivotally attached to the seat bottom. The seatback comprises a seatback support shell comprising a shaped resinous sheet comprising a main seat portion, a left side bolster, and a right side bolster. The seatback support shell further comprising a left side hinge extending between and connecting the left side bolster and the main seat portion to allow relative movement between the left side bolster and the main seat portion and a right side hinge extending between and connecting the right side bolster and the main seat portion to allow relative movement between the right side bolster and the main seat portion. The vehicle seat assembly further comprising trim cover disposed over the seatback and the seat bottom.

20 Claims, 6 Drawing Sheets

(56) References Cited

U.S. PATENT DOCUMENTS

| | | | |
|---|---|---|---|
| 5,707,109 A * | 1/1998 | Massara | B60N 2/4415 |
| | | | 297/284.9 |
| 5,769,498 A | 6/1998 | Smith et al. | |
| 6,033,024 A * | 3/2000 | Pfau | A47C 7/20 |
| | | | 297/284.9 |
| 6,068,336 A * | 5/2000 | Schonauer | B60N 2/449 |
| | | | 297/284.1 |
| 6,283,552 B1 | 9/2001 | Halse et al. | |
| 6,802,563 B1 | 10/2004 | Mysliwiec et al. | |
| 7,232,174 B1 * | 6/2007 | Trott | B60N 2/0232 |
| | | | 296/65.17 |
| 7,490,899 B2 * | 2/2009 | McMillen | B60N 2/449 |
| | | | 297/284.1 |
| 8,844,966 B2 * | 9/2014 | Feller | B60N 2/4492 |
| | | | 280/728.2 |
| 9,834,166 B1 * | 12/2017 | Line | B60R 21/207 |
| 9,873,360 B2 * | 1/2018 | Line | B60N 2/64 |
| 2002/0060485 A1 | 5/2002 | Fischer et al. | |
| 2006/0273644 A1 | 12/2006 | Sturt et al. | |
| 2007/0228792 A1 * | 10/2007 | Chen | B60N 2/2851 |
| | | | 297/284.9 |
| 2008/0136237 A1 * | 6/2008 | Kayumi | B60N 2/4415 |
| | | | 297/284.9 |
| 2009/0218858 A1 * | 9/2009 | Lawall | B60N 2/4235 |
| | | | 297/216.1 |
| 2012/0235458 A1 | 9/2012 | Andersson et al. | |
| 2014/0117731 A1 * | 5/2014 | Asli | B64D 11/06 |
| | | | 297/284.9 |
| 2014/0361590 A1 * | 12/2014 | Line | B60N 2/449 |
| | | | 297/284.9 |
| 2015/0197173 A1 * | 7/2015 | Hulway | B60N 2/643 |
| | | | 297/284.9 |
| 2015/0231998 A1 * | 8/2015 | Beier | B60N 2/4492 |
| | | | 297/284.9 |
| 2016/0009209 A1 * | 1/2016 | Cao | B60N 2/4802 |
| | | | 297/354.12 |
| 2017/0349133 A1 * | 12/2017 | Line | B60N 2/42745 |
| 2017/0355290 A1 * | 12/2017 | Line | B60N 2/643 |
| 2017/0368960 A1 * | 12/2017 | Whitmore | B60N 2/56 |
| 2017/0368973 A1 * | 12/2017 | Seo | B60N 2/682 |

* cited by examiner

SEAT ASSEMBLY HAVING SHELL WITH FLEXIBLE BOLSTERS

TECHNICAL FIELD

The present application relates to a seat assembly having a shell with flexible bolsters.

BACKGROUND

A vehicle seat having seat back designs are disclosed in U.S. Pat. Nos. 5,769,498; 6,283,552; and 6,802,563, for example.

SUMMARY

In at least one embodiment, a vehicle seat assembly is provided. The vehicle seat assembly may include a seat bottom and a seatback pivotally attached to the seat bottom and trim cover disposed over the seatback and the seat bottom. The seatback may include a seatback support shell comprising a shaped resinous sheet comprising a main seat portion, a left side bolster and a left side hinge extending between and connecting the left side bolster and the main seat portion to allow relative movement between the left side bolster and the main seat portion of 5° to 90°. The seatback may also include a right side bolster and a right side hinge extending between and connecting the right side bolster and the main seat portion to allow relative movement between the right side bolster and the main seat portion of 5° to 90°.

DETAILED DESCRIPTION

Figure 1:
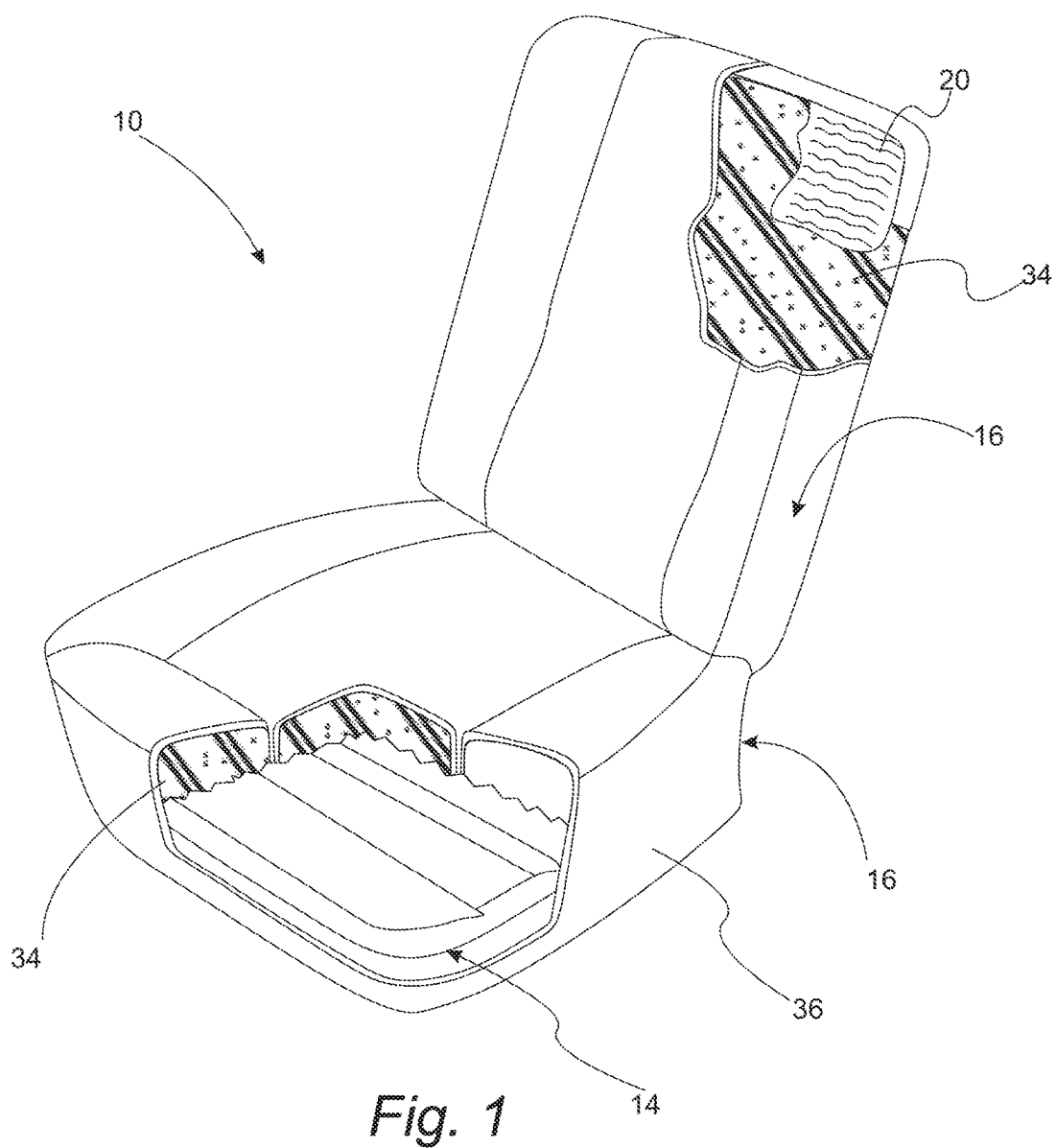
FIG. 1 is a perspective view of a representative vehicle seat assembly in accordance with an embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except in any examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of" and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Referring now to the figures, where like numerals are used to designate like structure throughout to the drawings, a schematic vehicle seat assembly in accordance with at least one embodiment of the present disclosure is generally shown at 10 in FIG. 1. While the vehicle seat assembly 10 is illustrated in FIG. 1 to be a bucket seat assembly, it should be understood that the principles of the present disclosure are applicable to other types of seat assemblies, such as bench, captain, and other types of seat assemblies.

The seat assembly 10 may be configured for use in a vehicle, such as motor vehicle like a car or truck. As shown in FIG. 1, the vehicle seat assembly 10 includes a seat frame, generally indicated at 14 having a plurality of mounting brackets (not shown) adapted to operatively secure the seat frame within a vehicle. The seat frame 14 may be constructed from any material suitable for application within a vehicle seat assembly 10, such as aluminum, steel or other metal alloy or a suitable polymer. Further, the seat frame 14 may be manufactured using a technique commonly known in the art, relative to the type of material employed. By way of example, manufacturing techniques may include stamping, welding, fastening or molding a suitable material to form a seat frame 14.

The vehicle seat assembly 10 includes a seat back, generally indicated at 16, and a lower seat assembly, generally indicated at 18. In at least one embodiment, the vehicle seat assembly 10 further includes a seat foam cushion generally indicated at 34. The seat foam cushion 34 can be conventionally secured to the seat frame 14 by any method generally known in the art, such as by an adhesive.

Figure 2:
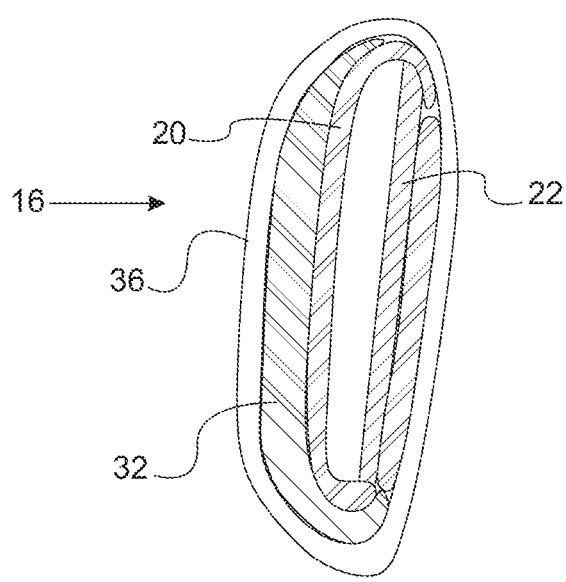
FIG. 2 is a cross sectional view of the vehicle seat assembly of FIG. 1.

The seat back 16 includes a seatback shell 20. In at least one embodiment, as best shown in FIG. 2, the seatback shell 20 is attached (e.g., slide over frame or snapped on to) to a seatback frame 22.

In the illustrated embodiments, a back foam cushion 32 is provided for comfort and is disposed over the shell 20. The foam cushion 32 may be secured to the shell 20 by any method generally known in the art, such as by an adhesive.

While the back foam cushion and the seat foam cushion 32 and 34 can have any suitable size and configuration, in at least one embodiment, the cushions 32 and 34 independently have an average thickness of 5 to 100 mm, in other embodiments of 20 to 70 mm, and in yet other embodiments of 30 to 50 mm. In other embodiments, the back foam cushion and the seat foam cushion 32 and 34 independently have a length of 400 to 1400 mm and a width of 300 to 600 mm, and in yet other embodiments a length of 900 to 1200 mm and a width of 350 to 500 mm. In at least one embodiment, if present, the back foam cushion 32 has a shape and size that are independently similar to the shape and/or size of the shell 20. In at least another embodiment, the back foam cushion 32 has a shape and size that are independently the same as the shape and/or size of the shell 20. In yet another embodiment, the back foam cushion 32 has a shape that his similar to the shape of the shell 20 but a size that is bigger than the size of the shell 20 such that the shell 20 is received within the back foam cushion 32.

The back foam cushion and the seat foam cushion 32 and 34 can independently comprise any suitable cushion material such as a suitable resilient polymer and can independently be formed in any suitable manner. In at least certain embodiments, the cushion material comprises conventional polyurethane foam, soy-based foam, silicone, thermoplastic olefins, thermoplastic urethanes, and/or natural oil-based expanded polyurethanes and the like. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574.

While the figures illustrate cushions 32 and 34 being present, it should be understood that one or both of the cushions could be omitted. If the back foam cushion 32 is omitted, the shell 20 provide the necessary comfort for the occupant. If the seat foam cushion 34 is omitted, a shell (not shown) similar to shell 20 could be provided by the necessary comfort.

The vehicle seat assembly 10 also includes trim material 36 adapted to engage the foam cushions 32 and 34, and/or shell(s) 20 in a covering relationship. The trim material 36 may include any material commonly known in the art. By way of example, some of the known materials include cloth, leather, or polymers of sufficient quality and thickness for use in seat trim applications. Polymer trim materials may include a flexible closed cell polymer skin material such as polyvinyl, polyvinyl chloride (PVC), thermoplastic olefin (TPO), or thermoplastic urethane (TPU).

Additionally, materials for use as trim material 36 may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass or nylon may be applied to the foam backing or back of the trim material 34 for increasing strength without increasing rigidity.

The shell 20 is a shaped resinous sheet and can be formed from any suitable structural material, such as thermoplastic polymer. Examples of suitable thermoplastic polymers include, but are not limited to, expanded polypropylene (EPP), polyethylene terephthalate (PET), PET copolymers, and composites thereof, and combinations thereof. Composite layers include the thermoplastic polymer and filler or fibrous materials such as felt, Azdel, and shoddy. In a refinement, shaped resinous sheet of the shell 20 includes a first thermoplastic layer and a second thermoplastic layer, each layer independently including a thermoplastic polymer. In some variations, shaped resinous sheet of the shell 20 includes PET fibers that may be held together with a binder. As such, the fibers may include bi-component fibers comprising PET. Resinous sheet of the shell 20 may be substantially entirely PET or may be formed of, for example, 50% to 60% PET and the remainder CoPET.

In a refinement, shaped resinous sheet of the shell 20 has a thickness from about 5 to 50 mm. In another refinement, shaped resinous sheet of the shell 20 has a thickness from about 15 to 25 mm. Thickness and density can be changed to provide an appropriate level of rigidity. Shaped resinous sheet of the shell 20 can be molded from any number of processes such as compression molding, injection molding, and the like. Molding may be performed at temperatures from 300 to 450° C.

If the shell 20 is made of structural foam pad, any suitable structural foam can be employed. In at least one embodiment, suitable structural foams may have a rigidity and/or hardness (i.e., compressive strength) that is higher than conventional high resilience seating cushion polyurethane foam. One suitable structural foam is a relatively stiff, rigid polyurethane foam. Another suitable example is an expanded polymer layer.

In at least one embodiment, a suitable structural foam comprises a molded expanded polyolefin (EPO) layer. Suitable examples of expanded polyolefin (EPO) include, but are not necessarily limited to, expanded polyethylene (EPE), expanded polypropylene (EPP), expanded polybutylene (EPB), and copolymers of ethylene, propylene, butylene, 1,3-butadiene, and other olefin monomers, such as alpha-olefin monomers having from 5-18 carbon atoms, and/or cycloalkylene monomers such as cyclohexane, cyclopentene, cyclohexadiene, norbornene, and aromatic substituted olefins, such as styrene, alpha-methylstyrene, paramethylstyrene, blends thereof and the like. In at least one embodiment, the EPO is expanded polypropylene (EPP) and its copolymers with ethylene, propylene and butylene.

In at least one embodiment, the structural foam shell 20 is molded over the frame 22 in any suitable manner. In one embodiment, the frame 22 is placed in a mold, with certain parts, such as brackets being covered and thus protected from the foam forming materials introduced into the mold to form the structural foam shell 20. Structural foam forming materials are then introduced into the mold to form the shell 20.

Figure 3:
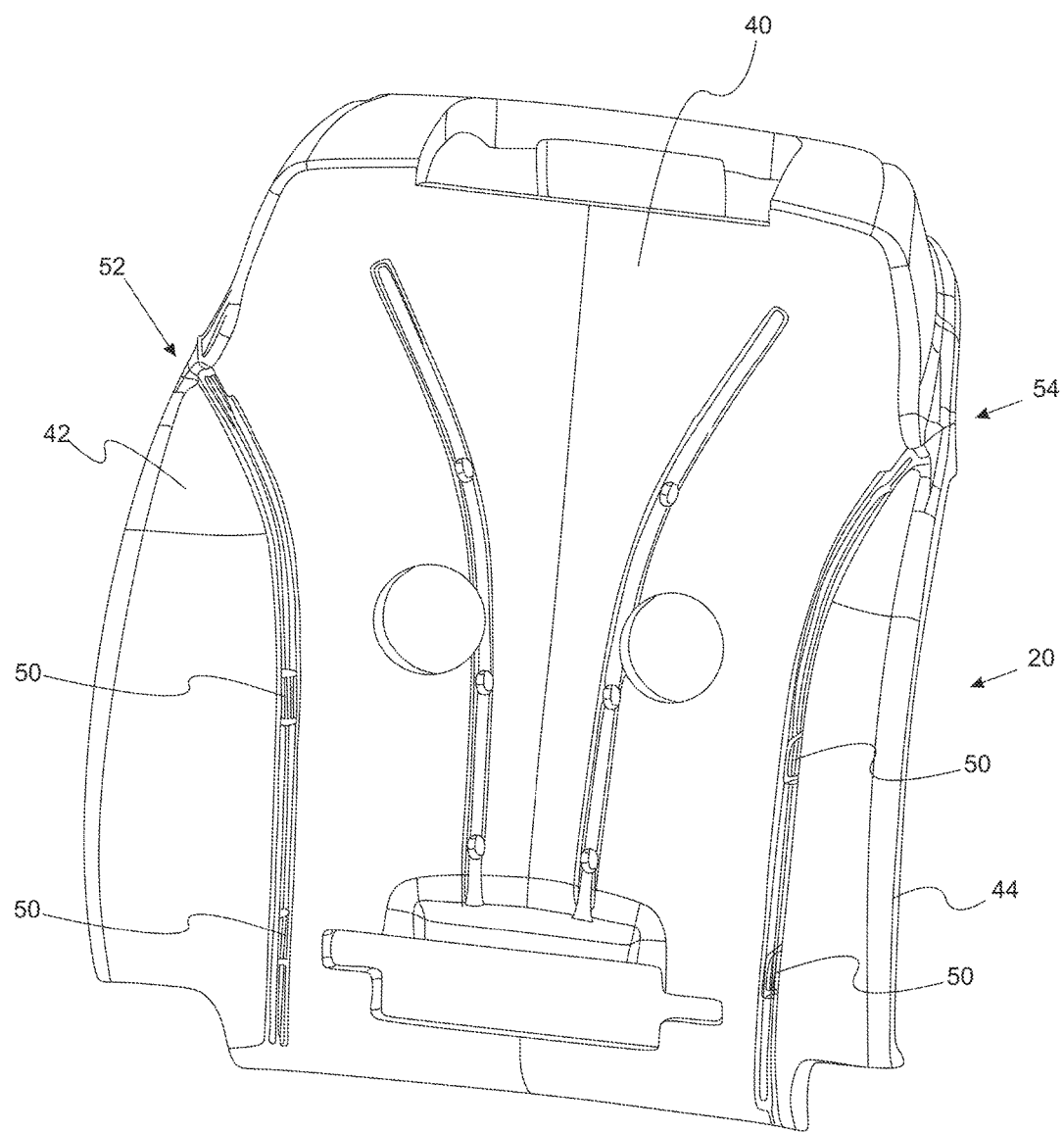
FIG. 3 is a perspective view of a component of the vehicle seat assembly illustrated in FIG. 1.

Referring to FIG. 3, the support shell 20 comprises a main body portion 40, a left side bolster 42 and a right side bolster 44. A left side hinge 52 extends between and connects the left side bolster 42 and the main body portion 40 to allow relative movement between the left side bolster 42 and the main body portion 40 of the shell 20. In at least one embodiment, the left side hinge 52 allows for a controlled amount of relative movement between the left side bolster 42 and the main body portion 40 of the shell 20 of 5° to 90° towards the top ("A") surface or the bottom surface ("B") of the shell, in another embodiment of 10° to 70°, and in yet another embodiment of 25° to 60°.

A right side hinge 54 extends between and connects the right side bolster 44 and the main body portion 40 to allow relative movement between the right side bolster and the main seat portion of the shell. In at least one embodiment, the right side hinge 54 allows for a controlled amount of relative movement between the right side bolster 52 and the main body portion 40 of the shell 20 in an amount of 5° to 90° towards the top ("A") surface or the bottom surface ("B") of the shell, in another embodiment of 10° to 70°, and in yet another embodiment of 25° to 60°.

The hinges 52 and 54 can be living hinges and/or could be separate hinge components. By living hinges, it is meant that the hinge is integral with the components it connects. If living hinges, the hinges 52 and 54 are made of the same material as the main body portion 40 and the bolsters 42 and 44, with the hinges 52 and 54 being thinner than the main body portion 40 and the bolsters 42 and 44. In at least one refinement, the hinges 52 and 54 are made of a flexible material, more flexible than the material of the main body portion 40 and the bolsters 42 and 44. In a further refinement, the hinges are made of rubber.

In a refinement, the hinges could have a thickness that 2% to 20% of the thickness of the main body portion 40 and the bolsters 42 and 44, in another embodiment that is 5% to 15% of the thickness of the main body portion 40 and the bolsters 42 and 44, and in another embodiment that is 8% to 12% of the thickness of the main body portion 40 and the bolsters 42 and 44. In at least one embodiment, the thickness of the main body portion 40 and the bolsters 42 and 44 adjacent the hinges 52 and 54 are, independently, 1-6 cm, and in anther embodiment are 1.5-5 cm, with the thickness of the hinges 52 and 54 adjacent the main body portion 40 and the bolsters 42 and 44 are, independently, 0.2-0.8 cm. and in another embodiment are 0.3-0.5 cm.

Alternatively, or in addition to lesser relative thicknesses, the hinges 52 and 54 could have weakened portions to provide for the controlled amount of relative movement between the left and right side bolsters 42 and 44 and the main body portion 40 of the shell 20. In at least one embodiment, one or more weakened portions can be provided that can independently comprise a 40-60% removal or reduction of material thickness along the line of contact between the main body portion 40 of the shell 20 and one of both of the bolsters 42 and 44 at the hinges 52 and 54, respectively. In at least one embodiment, one or more length of 1 to 3 cm. along one or more contact lines can have a material thickness reduction of 0.5 to 2.25 cm. relative to adjacent portions. In one example, one or more length of 2.5 cm along one or more contact lines can have a reduction of 1.25 cm. relative to adjacent portions can be created by providing additional tool ridge interference, or other interference, in the designated areas of material reduction.

The hinges 52 and 54 are positioned on the shell 20 to be spaced from the trim cover trenches and the seat frame motor to avoid contact with these seat parts so they do not impede the relative movement between the left and right side bolsters 52 and 54 and the main body portion 40 of the shell 20. For instance, the areas in front of, and/or behind, the movable bolsters 52 and 54 are free of any integrated seating components in the seating system that would materially affect the bolsters 52 and 54 ability to move as desired.

In at least one embodiment, the hinges 52 and 54 comprise a plurality of spaced apart tabs 50 extending between and connecting portions of the left and right side bolsters 42 and 44, respectively, with the main body portion 40 of the shell 20. In this embodiment, the left and right side bolsters 42 and 44 are separate from the main body portion 40 of the shell 20. While any number of tabs 50 can be employed, in at least one embodiment, 2 to 10 tabs 50 are employed independently for each of the hinges 52 and 54, in another embodiment of 3 to 8 tabs 50 are employed, and in yet another embodiment 4 to 7 tabs 50. While the tabs 50 can be spaced in any suitable manner, at least one embodiment, the tabs 50 are spaced 0.5 to 10 cm apart, in another embodiment 1 to 8 cm apart, and in yet another embodiment 2 to 6 cm apart.

Figure 4:
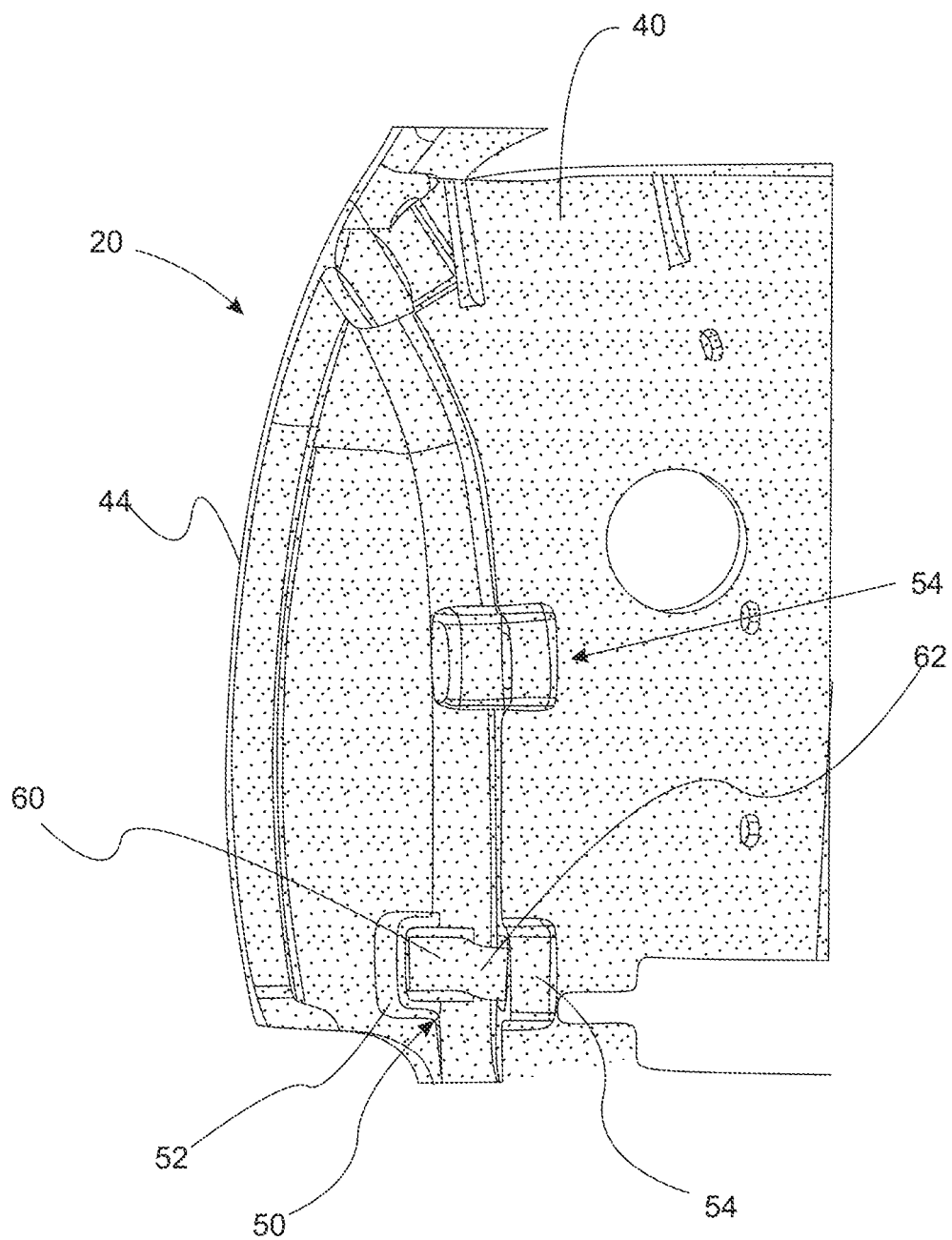
FIG. 4 is a rear view of the component illustrated in FIG. 3.

In the embodiment illustrated in FIG. 4, the bolsters 42 and 44 have receptacles 52 in the main body portion 40 has corresponding receptacles 54. The tabs 50 each have a first end portion 60 and a second end portion 62. The first end portions 60 of the tabs 50 are releasably securable in in a respective receptacle 52 in the second end portions 62 are releasably securable in a respective corresponding receptacle 54.

Figure 5:
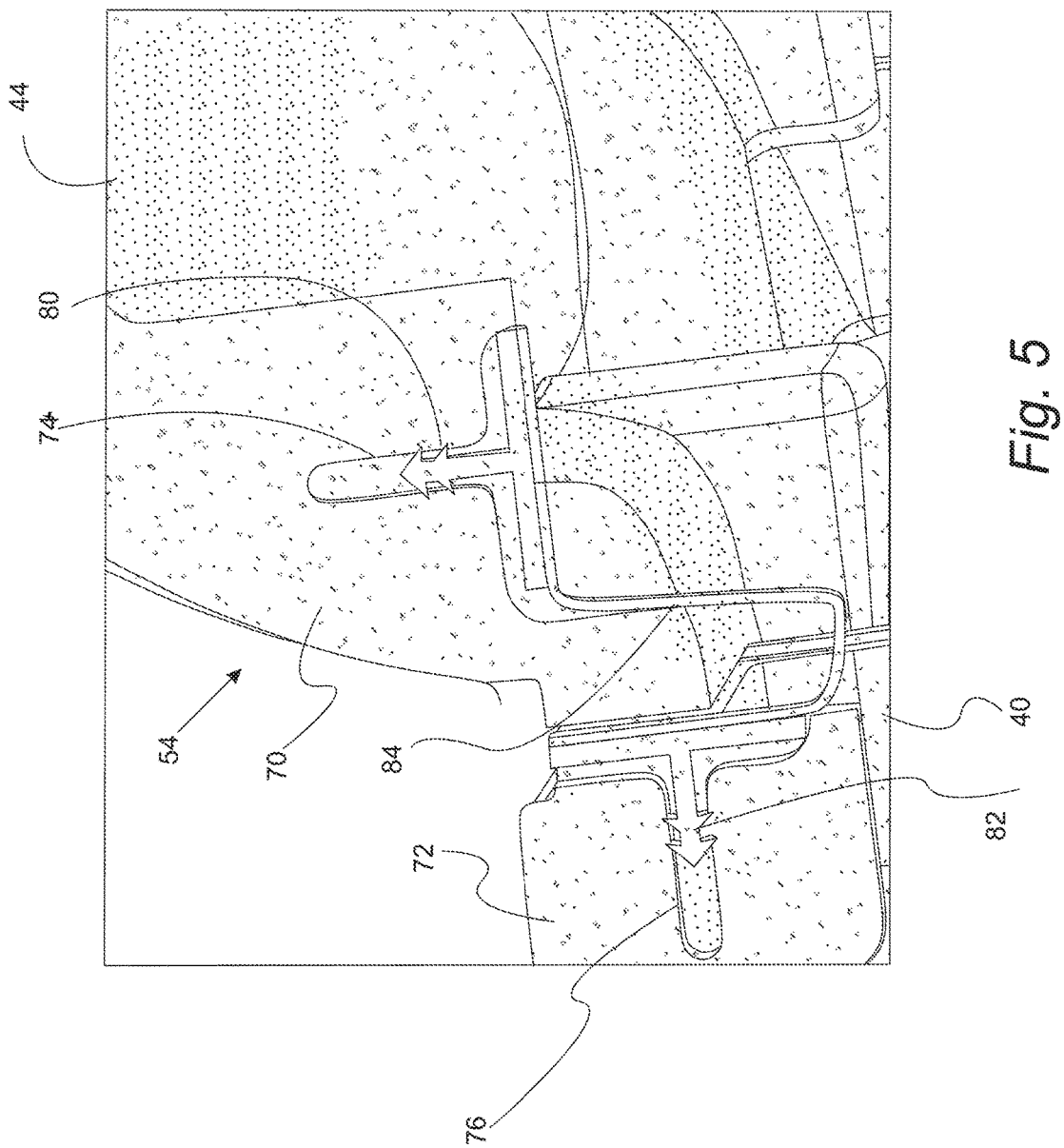
FIG. 5 is a similar to FIG. 4 showing a different embodiment.

In the embodiment illustrated in FIG. 5, the main body portion 40 has a receptacle 72 having a channel 76 and the bolsters 42 and 44 (only one of which is shown) have receptacles 70 having channels 74. Fasteners 78 having a first arrowhead end 80 and a second arrowhead end 82 are provided with the first arrowhead end 80 being releasably securable in the second arrowhead end 82 being releasably securable in the channel 74. Each of the fasteners 78 have a tether 84 extending between and connecting arrowhead ends 80 and 82. The above described arrangement is considered to be a flipped joint.

Figure 6:
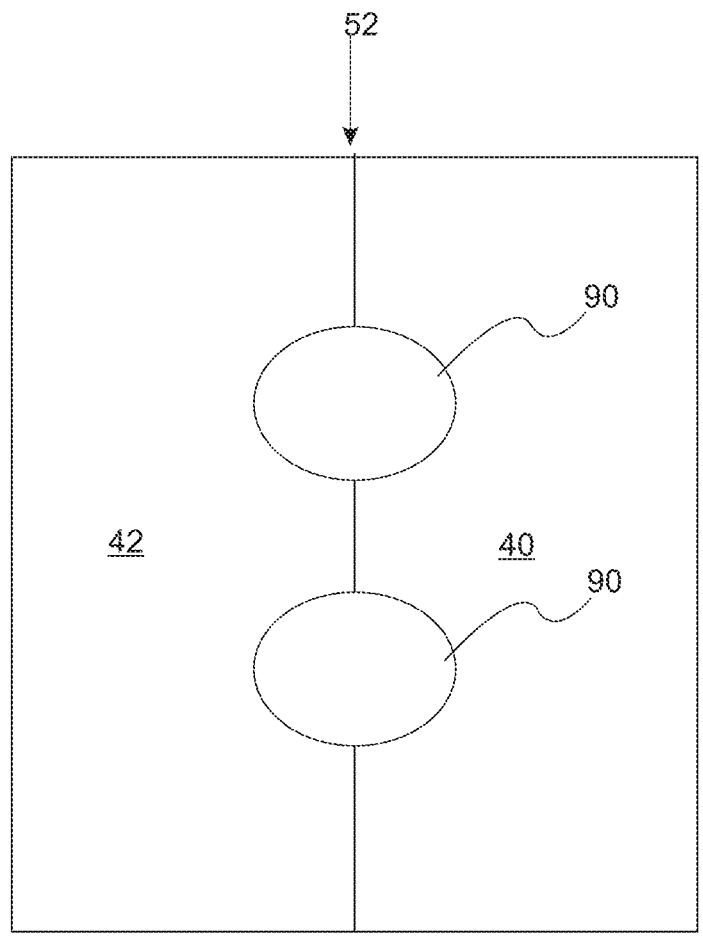
FIG. 6 is a view similar to FIG. 5 showing a different embodiment.

In the embodiment illustrated in FIG. 6, along the contact lines between the main body portion 40 and the bolsters 42 and 44 (only one of which is shown) an adhesive, such as a pressure sensitive adhesive sheet 90, can be provided to form the hinges 52 and 54. It should be understood that the location of the adhesive 90 can impact the direction the bolsters 42 and 44 can move. For instance, if the adhesive sheet 90 is on the rear surface of the shell 20, the bolsters 42 and 44 can only move in the rearward direction, and if the adhesive sheet 90 is on the front surface of the shell 20, the bolsters 42 and 44 can only move in the forward direction.

The details, designs, variants, aspects and embodiments shown and described herein are applicable to automotive, other vehicular, and non-regulated seating. While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention. It should be understood that the present disclosure contemplates a seat system or a thoracic region support seating system comprising any combination of features shown in the figures and/or described in the application.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
a seat bottom;
a seatback pivotally attached to the seat bottom, the seatback comprising a seatback support shell comprising a shaped resinous sheet comprising a main seat portion, a left side bolster, a right side bolster, a left side hinge extending between and connecting the left side bolster and the main seat portion to allow relative movement between the left side bolster and the main seat portion of 5° to 90° and a right side hinge extending between and connecting the right side bolster and the main seat portion to allow relative movement between the right side bolster and the main seat portion of 5° to 90°;
a foam cushion disposed on the seatback shell; and
trim cover disposed over the seatback and the seat bottom.

2. The vehicle seat assembly of claim 1 further comprising a seatback frame with the seatback support shell being supported on the seatback frame.

3. The vehicle seat assembly of claim 1 wherein the hinges are living hinges.

4. The vehicle seat assembly of claim 3 wherein the hinges, the bolsters and the main seat portion are all made of a first material.

5. The vehicle seat consisting of claim 4 wherein the first material comprises structural foam.

6. The vehicle seat assembly of claim 5 wherein the structural foam comprises expanded polypropylene (EPP) foam.

7. The vehicle seat assembly of claim 4 wherein the thickness of the hinges relative to the thickness of the bolsters and main body portion adjacent the hinges are 2% to 20% of the thickness of the main body portion and the bolsters.

8. The vehicle seat assembly of claim 1 wherein the hinges are not living hinges.

9. The vehicle seat assembly of claim 8 wherein hinges comprise tabs having first ends inserted into the main body portion and second ends, each of second ends being inserted into a respective one of the bolsters.

10. The vehicle seat assembly of claim 8 wherein hinges comprise tabs having first ends connected to the main body portion and second ends, each of second ends being connected to a respective one of the bolsters.

11. The vehicle seat assembly of claim 1 wherein the hinges are made of the different material than the material of the main body portion and the bolsters.

12. The vehicle seat assembly of claim 11 where the hinges are made of tape extending between and secured to the main body portion and the bolsters.

13. The vehicle seat assembly of claim 12 wherein the hinges are made of a flexible material, more flexible than the material of the main body portion, and the hinges being attached to the main body portion and the bolsters.

14. The vehicle seat assembly of claim 13 wherein the flexible material comprises rubber.

15. The vehicle seat assembly of claim 1 wherein the shaped resinous sheet comprises a thermoplastic polymer.

16. The vehicle seat assembly of claim 15 wherein the shaped resinous sheet has a thickness from about 5 to 50 mm.

17. The vehicle seat assembly of claim 1 further comprising a foam cushion disposed on the seatback shell, the seatback shell having open areas adjacent behind the side bolsters to allow the pivotal movement.

18. A vehicle seat assembly comprising:
a seat bottom;
a seatback pivotally attached to the seat bottom, the seatback comprising a shell comprising a shaped resinous sheet comprising a central body portion, a left side bolster, a right side bolster, a left side hinge connecting the left side bolster and the central body portion to allow relative pivotal movement along the hinge between the left side bolster and the central body portion and a right side hinge connecting the right side bolster and the central body portion to allow relative pivotal movement between the right side bolster and the central body portion;
trim cover disposed over the seatback and the seat bottom; and
wherein hinges have first ends and second ends, the first ends being connected to the main body portion and each of second ends being connected to a respective one of the bolsters.

19. The vehicle seat assembly of claim 18 further comprising a foam cushion disposed on the seatback shell.

20. A seatback support shell comprising:
a shaped resinous sheet having:
a main seat portion;
a left side bolster;
a right side bolster;
a left side hinge extending between and connecting the left side bolster and the main seat portion to allow relative movement to allow relative movement between the left side bolster and the main seat portion of up to 90° towards the top ("A") surface or the bottom surface ("B") of the shell; and
a right side hinge extending between and connecting the right side bolster and the main seat portion to allow relative movement between the right side bolster and the main seat portion of at least 5° towards the top ("A") surface or the bottom surface ("B") of the shell.

* * * * *

UNITED STATES PATENT AND TRADEMARK OFFICE
CERTIFICATE OF CORRECTION

PATENT NO. : 10,124,699 B2
APPLICATION NO. : 15/386317
DATED : November 13, 2018
INVENTOR(S) : Ashford Allen Galbreath et al.

Page 1 of 1

It is certified that error appears in the above-identified patent and that said Letters Patent is hereby corrected as shown below:

In the Claims

Column 8, Lines 43-44, Claim 20:
After "to allow relative movement"
Delete "to allow relative movement" (second occurrence).

Signed and Sealed this
Fourth Day of June, 2019

Andrei Iancu
*Director of the United States Patent and Trademark Office*